United States Patent [19]

Moll et al.

[11] Patent Number: 4,917,369
[45] Date of Patent: Apr. 17, 1990

[54] METHOD AND APPARATUS FOR POSITIONING LIMP WORKPIECES FOR TREATMENT THEREOF

[75] Inventors: Philipp Moll, Aachen; Albrecht Kaiser, Vlotho, both of Fed. Rep. of Germany

[73] Assignee: Pfaff Industriemaschinen GmbH, Kaiserslautern, Fed. Rep. of Germany

[21] Appl. No.: 47,976

[22] Filed: May 7, 1987

[30] Foreign Application Priority Data

Sep. 15, 1986 [EP] European Pat. Off. ............ 86112725

[51] Int. Cl.$^4$ ............................................. B65H 7/02
[52] U.S. Cl. ..................................... 271/228; 271/204; 271/268; 156/364; 156/556; 270/58; 198/465.4
[58] Field of Search .................... 271/1, 226, 227, 228, 271/241, 264, 265, 204, 205, 206, 82, 84, 85, 261, 268, 277, 9; 156/351, 362, 363, 364, 556; 112/121.15, 306, 121.11, 303, 153, 304, 262.1, 311; 901/7; 270/58, 53; 198/465.4, 420

[56] References Cited

U.S. PATENT DOCUMENTS

| 3,664,657 | 5/1972 | Hawley et al. ............ 112/121.11 X |
| 3,669,047 | 6/1972 | Hedegaard ...................... 112/121.15 |
| 3,726,399 | 4/1973 | Beamish et al. ................... 271/1 X |
| 3,817,157 | 6/1974 | Andresen, Jr. ................ 156/364 X |
| 3,856,607 | 12/1974 | Faltot et al. ........................ 156/351 |
| 3,897,945 | 8/1975 | Faltot et al. ........................ 271/227 |
| 3,989,235 | 11/1976 | Hüsges ................................. 270/58 |
| 4,036,156 | 7/1977 | Becker et al. ................ 112/121.26 |
| 4,086,860 | 5/1978 | Kosrow et al. .................... 112/153 |
| 4,176,832 | 12/1979 | Hughes et al. .................. 271/22 X |
| 4,419,949 | 12/1983 | Goodmon et al. ............... 112/262.1 |
| 4,498,404 | 2/1985 | Sadeh ............................ 112/121.12 |
| 4,541,353 | 9/1985 | Engle ............................. 271/277 X |

FOREIGN PATENT DOCUMENTS 6604491 1/1970 Fed. Rep. of Germany .
3436965 5/1985 Fed. Rep. of Germany .

Primary Examiner—H. Grant Skaggs
Assistant Examiner—Edward S. Ammeen
Attorney, Agent, or Firm—McGlew & Tuttle

[57] ABSTRACT

In a procedure for feeding two limp workpiece sheets intended to be treated together and/or connected with each other and positioning them with respect to each other, it is provided to clamp them in a planar suspended position in clips of trolleys guided by rails. They are moved by the trolleys to scan their contours in a scanning station and to align them relative to each other in an alignment station. The alignment position of the workpiece sheets is fixed through a coupling device, which acts upon clip holders on the trolleys and can be moved together with them. This simultaneously connects the trolleys assigned to each other in pairs into a structure moving as a unit. The workpiece sheets are subsequently guided in their fixed alignment position to a treatment or processing station.

3 Claims, 3 Drawing Sheets

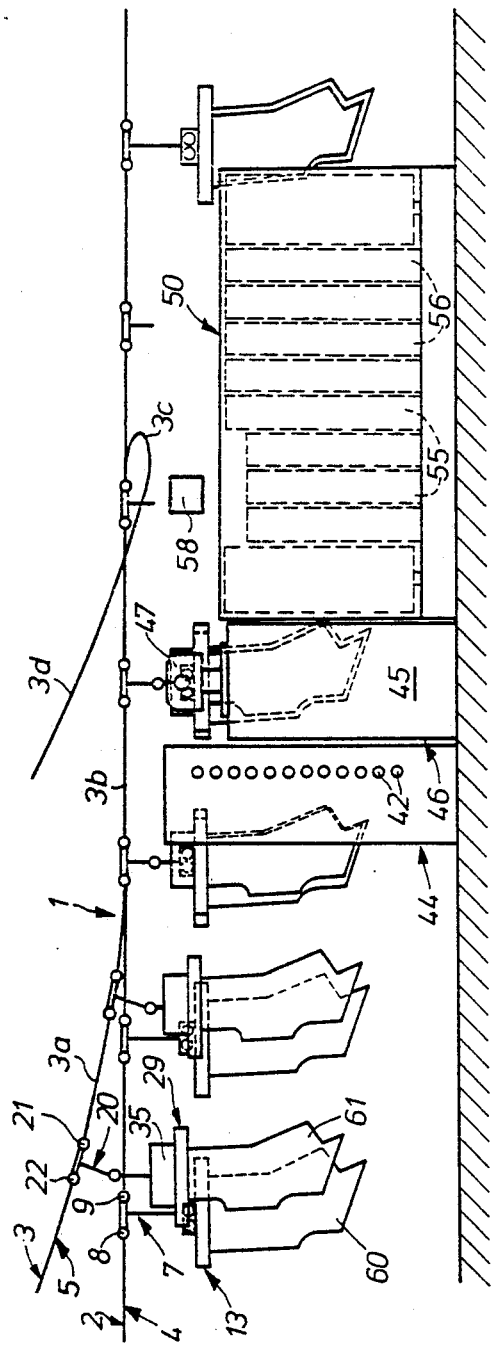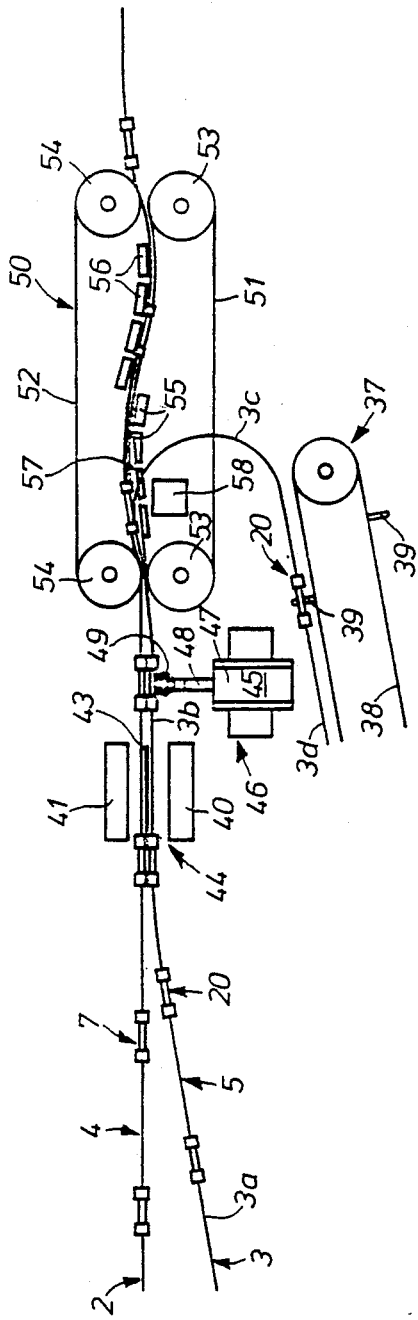

METHOD AND APPARATUS FOR POSITIONING LIMP WORKPIECES FOR TREATMENT THEREOF

FIELD AND BACKGROUND OF THE INVENTION

The invention relates in general to devices such as sewing machines for joining parts together and in particular to a new and useful procedure for feeding and positioning at least two workpiece sheets intended to be treated together or connected to each other.

In a procedure for aligning and leading together limp workpiece sheets known from U.S. Pat. No. 4,176,832 they are laid individually on a horizontal support. Subsequently, the current alignment position is determined by scanning at least a portion of their edges and with the aid of the values obtained an alignment process is carried out, in which the workpiece sheets are shifted on the support.

A condition for perfect alignment results is, however, that the workpiece sheets are in a state suitable for scanning, that is, the workpiece sheets have to be spread out planarly.

While small dimensioned and relatively stiff workpiece sheets assume a planar position on their own without special measures, in the case of large workpiece sheets which are, in addition thin and flexible, care must be taken to avoid folds or waves and, particularly turned under edges or eliminate them. Therefore, after placing the workpiece sheets they might possibly have to be smoothed out by hand. Because of the alignment principle based on which sensor driven pointlike holding elements acting upon the workpiece sheets force relative motion between the support and the workpiece sheets, there is the danger in aligning very flexible workpiece sheets that these might be warped by the resulting frictional force.

From the German OS 34 36 965 a process for aligning limp workpiece sheets is known in which the sheets are placed in a plane and without being warped on a support by specific conveyor devices. Special technological measures are employed in order to position the workpiece sheet in a way which would permit scanning, that is, spread out planarly for subsequent scanning and aligning. The bringing together of several workpiece sheets with respect to exact positions for subsequent common processing requires relatively high expenditures since for this purpose, a suction holder equipped conveying device is employed which must be precisely controlled.

SUMMARY OF THE INVENTION

The invention provides a procedure for the relative positioning of at least two workpiece sheets intended to be treated together or connected with each other in which the workpiece sheets can be brought in a simple manner into a position appropriate for scanning and can be aligned and joined together or treated together in an aligned operation in an equally simple way.

Taking the position of the surface center of gravity into account and holding the workpiece sheet essentially linearly along one edge allows the part of the workpiece sheet hanging down to assume, through the effect of gravity, a fold-free planar position, a position which permits the contour to be in an inherently stable state suitable for scanning.

In the suspended position the positioning of two or more workpiece sheets relative to each other can be carried out relatively simply in that, while maintaining a distance from each other sufficiently large to be unaffected by each other, they can be moved and aligned relative to each other. After being aligned, they only need to be pressed against each other and fixed in their relative positions. In this way, no special conveying device is required for bringing together the workpiece sheets either to be treated together or to be connected with each other subsequently as is customarily required for bringing together workpieces laid out horizontally.

From German GM 66 04 491 a device is known in which the workpiece sheets picked up in positions by drivable clips are delivered selectively by continuously running main tracks, onto auxiliary tracks and supplied to processing stations with the aid of address parts and reading devices. But since the individual processing stations have no preceding alignment stations, and, furthermore, the workpiece sheets are processed individually and therefore no relative positioning of two or several workpiece sheets takes place, and, lastly, the workpiece sheets are clipped at points and therefore hang down not ordered and folded in a manner unsuitable for edge scanning, this transporting procedure carried out with this device could not have given any suggestions for solving the task according to the invention.

The procedure according to which the workpieces are suspended by clips engaged at spaced locations allows a simplified hanging of a workpiece sheet into a corresponding clip respectively holding device in which the workpiece sheet can be clamped successively by sections.

In a procedure according to the invention, two alternative conveying procedures in which the workpiece sheets to be treated together or connected with each other are brought together either on separate conveyor tracks or on one common conveyor track with shunting sections.

Accordingly, it is an object of the invention to provide a device for positioning at least two limp workpiece sheets for treatment such as for sewing or rolling them together or performing operations thereon and which include a first conveyor movable through a first path and a second conveyor movable through a second path which has a path portion substantially parallel to the first path and wherein each conveyor carries a workpiece suspension clip for suspending a separate limp workpiece thereon for movement with the conveyors so that they may be positioned together at the path portion of the conveyors in which they are substantially aligned and which includes a scanning and aligning means associated with each conveyor which scans the workpiece as it is moved and regulates at least one of the conveyors to adjust the movement so that the suspended workpieces will be aligned.

A further object of the invention is to provide a method for positioning at least two limp workpiece sheets together which comprises suspending each sheet separately so that they hang freely and moving the suspended sheets to separate paths and toward each other until they are moved into positions in which they are aligned and fixing them in the aligned position.

A further object of the invention is to provide a method for positioning at least two limp workpiece sheets together which comprises suspending each sheet separately, moving a suspended sheet through separate paths and toward each other, checking the movement of each sheet on each path so as to ensure that they move into alignment in which they are positioned for further treatment.

A further object of the invention is to provide a device for positioning at least two limp workpiece sheets which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

In the drawings:

FIG. 1 is a schematic representation of a workpiece aligning device constructed in accordance with the invention;

FIG. 2 is a top plan view of the device shown in FIG. 1;

DESCRIPTION OF THE PREFERRED EMBODIMENTS

Figure 3:
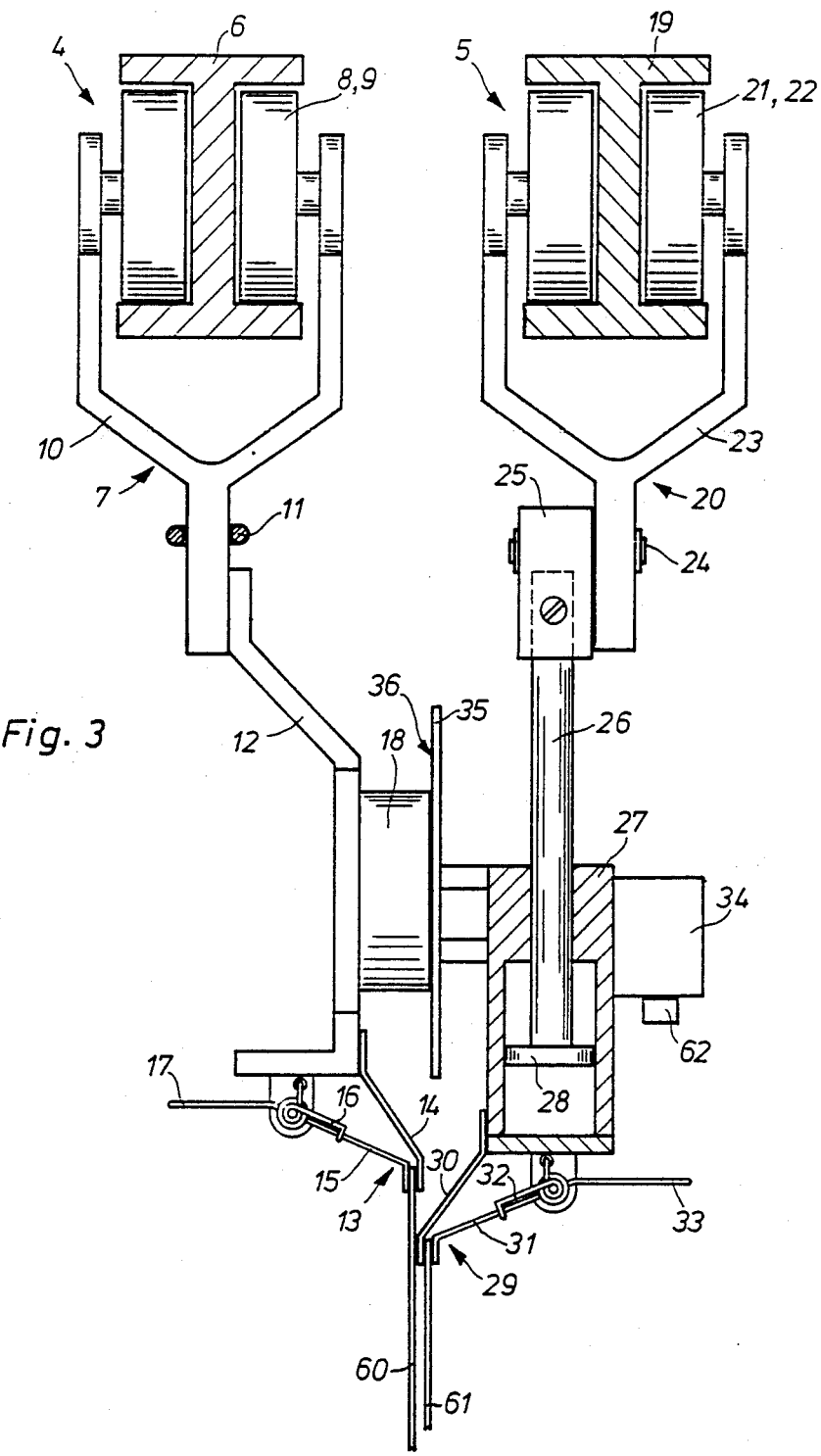
FIG. 3 is a partial sectional view of two trolleys and their clips taken along the line III—III of FIG. 2.
Figure 4:
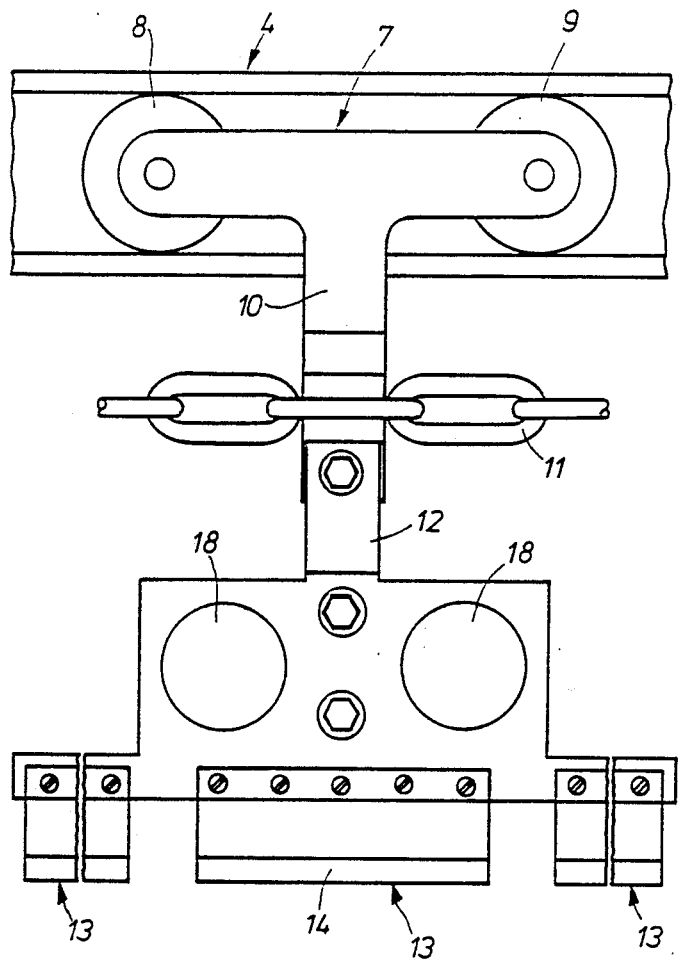
FIG. 4 is a view of a trolley with rigid holding device for three clips.
Figure 5:
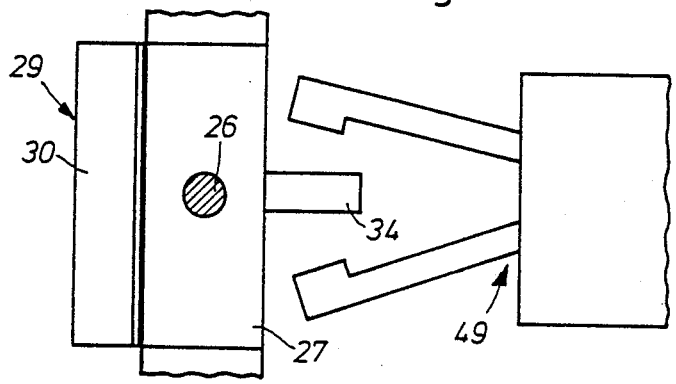
FIG. 5 is a view from above of a gripping device of a robot with a respect to the gripping strip of the movable clip holder of a trolley.

Referring to the drawings in particular the invention as embodied therein comprises a device for positioning at least two limp workpiece sheets for treatment which comprises a first conveyor 1 movable through a first path and a second conveyor 2 movable through a second path which has a path portion 3B which is substantially parallel to the first path. At least one workpiece suspension clip 29 is provided for each conveyor 1 and 2 for suspending a separate limp workpiece sheet 60 or 61 thereon for movement with the associated conveyor. In accordance with the invention scanning and aligning means 44 and 46 comprise aligning sensors 42 and aligning means 45 which are associated with at least one of the conveyors for adjusting its movement so that the workpieces which are suspended on each conveyor are moved into an aligned position at the path portion 3B. In the aligned position that the device advantageously includes coupling means 36 for fixing the workpieces in the aligned position. In addition means such as a joining press generally designated 50 are provided for securing the limp sheets together.

The workpiece aligning device, represented in FIG. 1 and FIG. 2 only schematically and only partially, has two conveying tracks 2 and 3. The conveying track 2 is formed by a chain driven circular conveyor 4 circulating in the horizontal plane and the conveyor track 3 is formed by a gravity driven overhead track conveyor 5.

The circular conveyor 4 has structural rails 6 fastened to a rack not shown here. On the rails 6 trolleys 7 are located which include wheel sets 8 and 9 and a forked retaining clip 10 (FIG. 3) connecting the two with each other. A A drive chain 11 attaches to the retaining clip 10. A driving motor (not shown) is connected to the chain 11. On the retaining clip 10, an offset support plate 12 is fastened which carries on its lower end three clips 13 arranged next to each other. Each clip 13 has a fixed clip jaw 14 and one movable clip jaw 15. The clip jaws 15 are held in the closed position by a leg spring, 16. On each clip jaw 15 there is a manipulating arm 17 by which the particular clip 13 can be opened. Two permanent magnets 18 are, also, fastened on the support plate 12.

The overhead conveyor 5 has section rails 19 fastened to a rack (not shown). On the rails 19 trolleys 20 are arranged which include two wheel sets 21 and 22 and a forked retaining clip 23 connecting them with each other. On a bolt 24 located on the retaining clip 23 a receiving part 25 for a rod 26 is pivoted. On the rod 26 a hollow carrier 27 is located which can be shifted in the vertical direction as well as rotated around the longitudinal axis of the rod 26. A stop plate 28 at the lower end of the rod 26 forms an axial ensurance against the carrier 27 falling down.

On the carrier 27 three clips 29 are located arranged next to each other. Each clip 29 has a fixed clip jaw 30 and a movable clip jaw 31. Each of the clip jaws 31 is held in the closed position by a leg spring 32. On each clip jaw 31 manipulating arm 33 is located by which the clip 29 can be opened. On the carrier 27, moreover, there is a gripping strip 34 projecting sideways and located opposite it there is a magnetizable plate 35.

If a trolley 7 of the conveyor 2 and a trolley 20 of the conveyor 3 approach each other so closely that the permanent magnets 18 make contact with the plate 35, both trolleys 7 and 20 are held in a dynamic connection in which the permanent magnets 18 and the plate 35 together form a coupling device 36.

The conveyor track 3 has according to FIG. 1 an inclined section 3A inclined relative to the horizontal, which according to FIG. 2 leads obliquely to the straight conveyor track 2. Subsequent to section 3A, the conveyor track 3, according to FIG. 2 has a horizontal section 3B running parallel to the conveyor track 2. Following section 3B is an arc-shaped section 3C having a downward inclination which changes over into a straight upward inclined section 3D.

In addition to the conveying track 3, a drag conveyor 37 is provided which has on a rotating pulling device 38 a large number of outward projecting fixtures 39 spaced equidistant from each other. One leg of the pulling device 38 runs at a small distance parallel to section 3D of the conveying track 3 and the fixtures 39 are at such a height relative to the section rail 19 that they are able to engage the retaining clip 23 of the trolley 20 in this area.

At the beginning of section 3B of the conveying track 3 a scanning device 40 is located and opposite it on the side of the conveying track 2 a scanning device 41. The scanning devices 40 and 41 have a large number of sensors 42 comprising of light emitters and light receivers connected to a known evaluating circuit not shown. A reflecting plate 43 is located between the two conveying tracks 2 and 3 in the region of the two scanning devices 40 and 41. The scanning devices 40 and 41 and the reflecting plate 43 together form a scanning station 44.

Next to the scanning device 40 there is an aligning station 46 which is formed by a robot 45. The robot 45 has a drive unit 47, which can be shifted vertically as well as rotated, for an arm 48, which can be moved axially as well as rotated, which has a gripping device 49.

At the end of section 3B of the conveying track 3 a continually operating joining press 50 is located. It has two transporting belts 51 and 52 which run over two drums 53 and 54 each and which have such slight distance from each other that their adjacent legs touch. The joining press 50 contains, moreover, a number of heating rods 55 assigned to the transporting belt 51 as well as an equal number of heating rods 56 assigned to the transporting belt 52. The heating rods 55 and 56 also serve as guiding means for the transporting belts 51 and 52.

For this purpose they are arranged in such a way that the legs of the transporting belts 51 and 52 gliding along them move in a flat S-shaped curve. Because of the S-shape the transporting belts 51 and 52 exposed to tensile stress lie firmly against each other in this region. The front heating rods 55 have a greater distance to the upper edge of the transporting belt 51 assigned to them than the succeeding heating rods 55. The transporting belt 51 therefore has a horizontal distance to the transporting belt 52 forming in this way a wedge-shaped gap 57.

In the transition area between section 3B and 3C of the conveying track 3, an electromagnet 58 is firmly fixed. With the electromagnet 58 a countermagnetic field can be generated during the passage of the two trolleys 7 and 20 connected with the permanent magnets 18 and the magnetizable plate 35 and, thus, the retaining force of the permanent magnets 18 can be neutralized.

The device functions in the following way:

The mechanism of function is explained using joining and connecting jacket front part 60 with lining parts 61 comparatively smaller of a material which can be heat sealed. The jacket fronts 60 accumulating in the cutting section in packets are manually separated into individual pieces. They are inserted with their upper edge individually and not deformed into the clips 13 of the trolley 7 and clapsed tight by sequential closing of the clips 13 in sections after which they are suspended planarly from the clips 13. In the same way the lining pieces 61 also obtained in packages are clasped with their upper edge individually and not deformed into the clips 29 whereupon they also are suspended planarly from the clips 29.

The trolleys 7 are driven perforce continuously equidistant from each other. The trolleys 20 of the conveying track 3 are released by a separating device not shown, at such time intervals on section 3A to run automatically that each trolley 20 meets with one trolley 7 at the transition from section 3A to section 3B. In this process the plate 35 of the trolley 20 approaches the permanent magnets 18 of the trolley 7 so closely, that it attracts plate 35. Trolley 20 is coupled dynamically to trolley 7 and is now moved by it.

The workpiece sheets 60 and 61 in their passage through the scanning station 44 have their contour scanned by the sensors 42. By comparing the signals of scanning device 40 with those of scanning device 41, the relative position of the lining parts 61 with respect to the jacket front 60 assigned to it is determined. If the actual position of the lining part 61 deviates from the intended position, the robot 45 is activated whereupon its gripping device 49 picks up the gripping strip 34. The robot 45 then is driven depending on the result of the comparison of the signals of both scanning devices 40 and 41 and, thus, corresponding to the deviation of the actual position of the lining parts 61 from its desired position. In the process, the carrier 27 with the clips 29 and the clamped in lining part 61, for vertical alignment is moved along the rod 26, and for horizontal alignment, is moved jointly with the trolley 20, and for an angular alignment is rotated with the rod 26 around the bolt 24. The dynamic holding of the plate 35 by the permanent magnets 18 is such that the aligning movements of the carrier 27 and the clips 29 caused by the robot 45 are not impaired, and that, after completion of the alignment process and after opening of the gripping device 49, the carrier 27 and the clips 29 with the lining part 61 retain the aligned position and, thus, the relative position to the jacket front 60.

After being aligned with respect to each other, the workpiece sheets 60 and 61 are guided into an interconnecting apparatus such as a joining press 50, having been picked up by the transporting belts 51 and 52 which are driven synchronous to the movement of the trolley 7. After the front section of the lining part 61 has been picked up by the transporting belt 51 and pressed against the jacket front 60 and the other transporting belt 52, the front clip of the three clips 29 within the gap 57 is opened by a mechanism (not shown) acting upon the manipulating arm 33. The upper, previously clamped, edge section of the lining part 61 is released. The same happens with the middle and the back clip 29 as soon as they have entered the gap 57.

After all clips 29 have been opened, the gripping strip 34 glides onto a strip 62 (FIG. 3) which is inclined upward, by which the carrier 27 is lifted so far that the clips 29 project above the upper edge of the transporting belt 51. In the time interval in which the front wheel set 21 of the trolley 20 reaches the transitional area between section 3B and 3C of the conveying track 3, a countermagnetic field to the permanent magnets 18 is generated with the electromagnet 58, by which their retaining power is neutralized to such an extent that the trolley 20 separate from the trolley 7 and can subsequently roll, driven by gravity, into the pick up area of the drag conveyor 37.

In the joining press 50 the heat-sealable lining part 61 is joined over a large area to the jacket front 60 through the heating effect of the heating rods 55 and 56 and the pressing force generated by the transporting belts 51 and 52. Since the upper edge section of the lining part 61 originally clamped in the clips 29 reaches the pressing area of the transporting belts 51 and 52 after its passage through the gap 57 and the operating area of the longer heating rods 55 and 56, it too is joined to the jacket front 60.

After the workpiece sheets 60 and 61 have passed through the joining press 50 and are suspended together from the trolley 7, they are either guided to a discharge station or to an additional processing station.

In a possible modification of the conveyor device, only one conveying track for both kinds of trolleys 7 and 20 is present. These are arranged alternatingly behind each other and are brought together in the shunting or the branching areas in pairs and are then moved along together.

Furthermore, the alignment position of the movable clip holding can be fixed through suitable stiffness of the joints.

If the workpiece sheets are intended to be sewn together while suspended, this can be achieved with a robot-guided sewing machine. In this case it can be of advantage to fashion the conveying device as drag circular conveyor (power and free) which permits uncoupling the trolleys from the drive and stopping them.

What is claimed is:

1. A method for positioning at least two limp workpiece layers together, comprising the steps of:

suspending a first workpiece layer in a first vertical plane and suspending a second workpiece layer in a second vertical plane, the vertical planes being separate with regard to one another;

moving the first workpiece layer and the second workpiece layer along paths, the paths converging such that the workpiece layers are moved toward one another in the suspended position allowing the workpiece layers to be moved into relative contact after the workpiece layers are moved toward one another;

determining the relative two-dimensional position of the first and second workpieces to determine if the first and second workpieces are in two-dimensional alignment;

shifting the position of one of the workpieces upon determination that the first and second workpieces are not in two-dimensional alignment, to fix the position of the first and second workpieces in two-dimensional alignment with regard to one another; and moving the first and second workpieces, fixed in two-dimensional alignment.

2. A method according to claim 1 wherein the sheets are clamped for suspension at at least two separate locations with the remainder left freely suspended.

3. A method according to claim 1 wherein the workpiece sheets are guided toward each other on separate conveyor tracks.

* * * * *